(12) United States Patent
Du et al.

(10) Patent No.: US 11,203,231 B1
(45) Date of Patent: *Dec. 21, 2021

(54) FRONT AXLE ASSEMBLY AND VEHICLE WITH THE SAME

(71) Applicant: SHANGHAI YINSHUN TRADING CO., LTD., Shanghai (CN)

(72) Inventors: Dehui Du, Shanghai (CN); Jia Fu, Shanghai (CN)

(73) Assignee: SHANGHAI YINSHUN TRADING CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/459,851

(22) Filed: Aug. 27, 2021

(30) Foreign Application Priority Data

Jun. 18, 2021 (CN) .......................... 202110682630.1
Jun. 18, 2021 (CN) .......................... 202121371525.8

(51) Int. Cl.
| | |
|---|---|
| *B60B 35/16* | (2006.01) |
| *B62D 7/18* | (2006.01) |
| *B60B 35/12* | (2006.01) |
| *F16B 7/04* | (2006.01) |

(52) U.S. Cl.
CPC ............ *B60B 35/16* (2013.01); *B60B 35/122* (2013.01); *B62D 7/18* (2013.01); *F16B 7/0406* (2013.01)

(58) Field of Classification Search
CPC ..... B60B 35/003; B60B 35/007; B60B 35/12; B60B 35/121; B60B 35/122; B60B 35/16; B62D 7/18; F16B 7/0406
See application file for complete search history.

(56) References Cited

U.S. PATENT DOCUMENTS

| | | | | |
|---|---|---|---|---|
| 2,512,881 | A * | 6/1950 | Smiley, Jr. ............... | B62D 7/18 384/396 |
| 3,549,166 | A * | 12/1970 | Moore ................... | B60G 7/005 280/93.512 |
| 7,377,598 | B2 * | 5/2008 | Doud .................... | B60B 35/003 301/137 |
| 2011/0204589 | A1 * | 8/2011 | Reiter ................... | B60B 35/003 280/124.11 |
| 2018/0066720 | A1 * | 3/2018 | Dilworth ............. | F16D 65/0056 |

\* cited by examiner

*Primary Examiner* — Jason R Bellinger
(74) *Attorney, Agent, or Firm* — Cheng-Ju Chiang

(57) ABSTRACT

The present disclosure provides an integral front axle assembly which includes an axle housing configured for connecting with a driveshaft; two axle tubes respectively connected with two opposite sides of the axle housing; two inner-C-forgings disposed at ends of the axle tubes and each being configured for connecting with a kingpin knuckle; and at least one connection structure, for detachably fixing at least one of the inner-C-forgings to a corresponding axle tube. The inner-C-forging has different mounting positions on the axle tube, correspondingly, the caster to pinion angle is different at inner-C-forging's different mounting positions. The caster angles on both sides and the pinion to driveshaft angle can be conveniently and independently adjusted while ensuring the support strength.

20 Claims, 8 Drawing Sheets

FRONT AXLE ASSEMBLY AND VEHICLE WITH THE SAME

CROSS REFERENCE TO RELATED APPLICATION

The patent application claims the priority of Chinese patent application number 202110682630.1, filed on Jun. 18, 2021, submitted by Shanghai Yinshun Trading Co., Ltd., and entitled "INTEGRAL FRONT AXLE AND VEHICLE WITH THE SAME", and Chinese patent application number 202121371525.8, filed on Jun. 18, 2021, submitted by Shanghai Yinshun Trading Co., Ltd., and entitled "INTEGRAL FRONT AXLE AND VEHICLE WITH THE SAME". The entire disclosure of the above-identified application is incorporated herein by reference.

FIELD OF THE INVENTION

The present disclosure relates to automobile structures, and in particular to a front axle assembly and a vehicle with the same.

BACKGROUND OF THE INVENTION

Since the launch of the first off-road vehicle model, the appearance, interior trim, four-wheel drive technology, and power system of the off-road vehicle have made great progress, however, as the core of the chassis, the integral front axle assembly has not been substantially improved.

In the past 25 years, the global sales of off-road vehicles have exceeded 30 million, and consumers' demand for customization and modification of such models is also increasing day by day. For global automakers and modification shops, changing to the bigger tires, replacing or enhancing the suspension system to lift the vehicle chassis for more ground clearance, and making the overall appearance of the vehicle more attractive have become the most common ways of customization in the industry. However, the lift of the vehicle chassis also brings the following problems that obviously affect the vehicle handling experience, moreover, seriously threaten the safety of the people in the vehicle.

1. With the vehicle chassis lifted, the pinion to driveshaft angle has increased, causing the u-joint of the driveshaft to vibrate, thereby easily damaging the u-joints, seals, etc., and greatly increasing the probability of abnormal damage to the driveshaft and transfer case. At the same time, obvious chassis vibration is generated due to the distortion of these components during the running of the vehicle.

2. The lifted vehicle chassis also brings the drastic change in the installation position of the integral front axle assembly, which results in the caster angles on both sides of the front axle becoming smaller at the same time. Consequently, when the vehicle is driving in a straight line, the front wheels will vibrate, the steering wheel will swing indeterminately, and the steering will be touchy at high speed and wheel return-to-center will be diminished when coming out of a turn, which makes the driver lose the road feeling and have no confidence in the vehicle handling even when driving on conventional roads.

3. The increase in tire diameter, the wear of tires, the left-right imbalance of the suspension system, and the combination of other factors cause the vehicle fail to run straight and even sway to left and right. Although the problem of not being able to run straight can be fundamentally solved by independently and properly adjusting the caster angle on one side, however, both inner-C-forgings on all the current integral front axle assemblies have been welded to the axle tube as a factory setting, thus, the caster angle cannot be independently adjusted.

4. In order to alleviate the vehicle deviation symptoms, (simply put, not being able to run straight line,) technicians often tend to adjust the wheelbase on one side by changing the length of the chassis control arms. However, not only this approach cannot fundamentally solve the problem of not being able to run straight, but also can make the vehicle produce distortion feeling when turning because the wheelbases on both sides are different from each other and no longer form a regular rectangle as the vehicle leaves the factory. In the course of running, the tires on both sides will do serpentine motion because of the wheelbases inconsistency, as a result, the direct feeling of driver is that the chassis is loose and unstable.

The fundamental reason why the above problems can not be solved is because of the common structural design of all the integral front axle assemblies in the current market: the caster angles on both sides and the pinion to driveshaft angle can not be independently adjusted, thus, consumers can only bear various vehicle handling problems and major potential safety hazards caused by this design. What global automakers and modification shops can do is to spend a lot of labor and time to continuously fine-tune the vehicles with underwhelming result, which leads to low customer satisfaction.

SUMMARY OF THE INVENTION

In order to solve the above-mentioned problems simultaneously, the present disclosure provides a front axle assembly, which can conveniently and independently adjust vehicle's caster angles on both sides and the pinion to driveshaft angle simultaneously while ensuring the support strength. Meanwhile, the original position and angle of the mounting points of all components on the axle tube is still intact, and the variables that affect the chassis wheelbase, directional accuracy, and suspension height will not be introduced.

The present disclosure provides a front axle assembly including an axle housing configured for connecting with a driveshaft; two axle tubes respectively connected with two opposite sides of the axle housing; two inner-C-forgings disposed at ends of the axle tubes and each being configured for connecting with a kingpin knuckle; and at least one connection structure, for detachably fixing at least one of the inner-C-forgings to a corresponding axle tube. The inner-C-forging has different mounting positions on the axle tube, correspondingly, a caster to pinion angle is different at inner-C-forging's different mounting positions.

Furthermore, the two inner-C-forgings are detachably fixed on the corresponding axle tubes respectively through two connection structures.

Furthermore, the connection structure includes a first connection hole positioned on the axle tube, a second connection hole positioned on the inner-C-forging and a connector, the connector passes through the first connection hole and the second connection hole to fix the inner-C-forging to the axle tube.

Furthermore, either the first connection hole or the second connection hole includes an oblong hole, an insert is arranged in the oblong hole, and a third connection hole is formed in the insert, the insert has a plurality of different models, and positions of axis of the third connection holes on the inserts are different in different models.

Furthermore, the axis of the third connection holes on the inserts of different models are all set on a same circle centered on the axis of the front axle assembly.

Furthermore, either the first connection hole or the second connection hole is composed of a plurality of through holes arranged at intervals, and the connection member extends through one of the plurality of through holes and into a corresponding first connection hole or second connection hole to fix the inner-C-forging to the axle tube.

Furthermore, at each of the first connection hole or the second connection hole, the axis of the plurality of through holes are arranged on a same circle with the axis of the front axle assembly as the center.

Furthermore, at each of the first connection hole or the second connection hole, the plurality of the through holes form two rows, in each row, the axis of the through holes are arranged on the same circle with the axis of the front axle assembly as the center, the distances from the axis of the two rows of through holes to the axis of the front axle assembly are different.

Furthermore, the axle tube is provided with a first flange, the first connection hole is formed in the first flange, and the second connection hole is formed on the end surface of the inner-C-forging.

Furthermore, the axle tube is provided with a first flange, the first connection hole is formed in the first flange, the inner-C-forging is provided with a second flange, and the second connection hole is formed in the second flange.

Furthermore, an accommodating cavity is formed in one of the first flange and the inner-C-forging, for receiving the inner-C-forging or the first flange therein.

Furthermore, the inner-C-forging is provided with a reinforcing shaft, the reinforcing shaft extends into the axle tube when the inner-C-forging is mounted on the axle tube.

The present disclosure also provides a vehicle including the front axle assembly.

According to the forgoing descriptions, in the present disclosure, at least one inner-C-forging 30 is separated from its corresponding axle tube 20 and is detachably connected to the axle tube 20 through the connection structure 40. When the caster angle needs to be adjusted, the components at one side of the vehicle can be disassembled, the connection structure 40 can be loosed, the inner-C-forging 30 can be rotated around its own axis to an appropriate angle and then be fixed to the axle tube 20 by tightening the connection structure 40. Because the kingpin knuckle is mounted on the inner-C-forging 30 and its installation angle is identical with the installation angle of the inner-C-forging 30, the caster angle can be adjusted by changing the installation angle of the inner-C-forging 30 with respect to the axle tube 20. Because the inner-C-forging 30 can be rotated about its own axis toward the front and the rear directions of the vehicle, no matter the caster angle at which side of the vehicle needs to be adjusted, it can be adjusted by adjusting the installation angle of the corresponding inner-C-forging 30. Furthermore, since the inner-C-forging 30 is separated from the axle tube 20, and the integrity of the axle tube 20 is ensured, so that the mounting points of the components on the axle tube 20, such as the support point of the shock absorber, the base of the control arm and the connection point of various pull rods, can be arranged on the complete axle tube 20. Therefore, vehicle's caster angles on both sides and the pinion to driveshaft angle simultaneously can be conveniently and independently adjusted while ensuring the support strength. Simultaneously, the original position and angle of the mounting points of all components on the axle tube is still intact, and the variables affecting the chassis wheelbase, directional accuracy and the suspension height will not be introduced.

In order to make the above mentioned purposes, characteristics and advantages be more apparent and understandable, detailed descriptions accompanying preferred embodiments are given below.

DETAILED DESCRIPTION OF PREFERRED EMBODIMENTS

Embodiments of the present disclosure will now be described more apparently and completely with reference to the embodiments. Obviously, the illustrated embodiments are only a part but not all of the embodiments of the present disclosure. All the other embodiments which could be obtained without creativity by one of ordinary skill in the art according to the illustrated embodiments would be claimed within the scope of the present disclosure.

The present disclosure provides a front axle assembly and a vehicle with the same. The front axle assembly can conveniently adjust the caster angle of a kingpin knuckle of the vehicle while ensuring the support strength.

Figure 1:
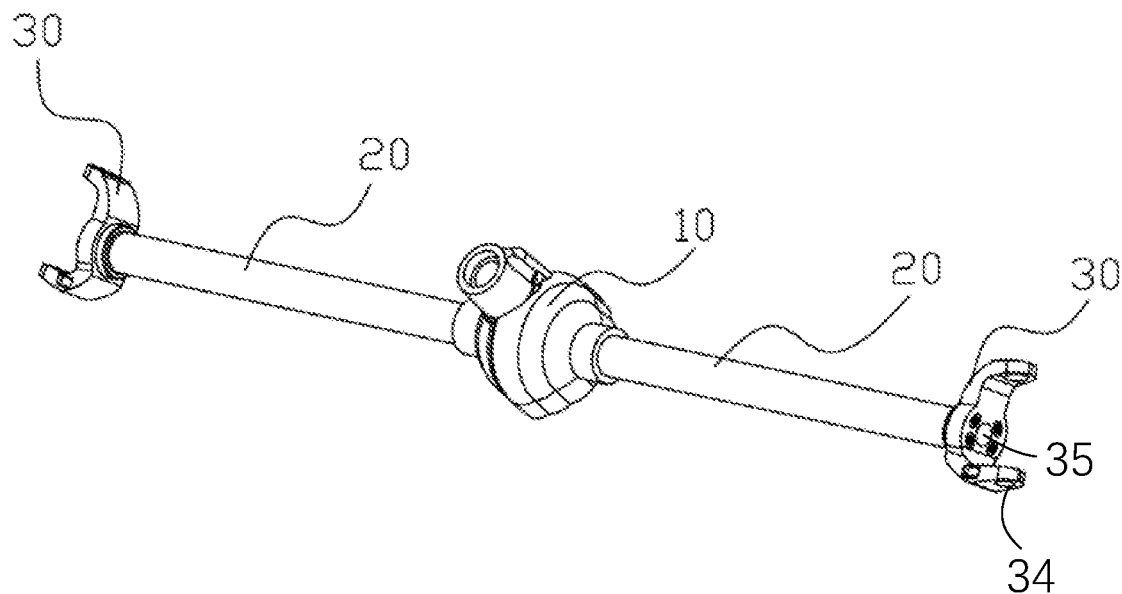
FIG. 1 is a schematic, isometric view of a front axle assembly according to a first embodiment of the present disclosure.
Figure 2:
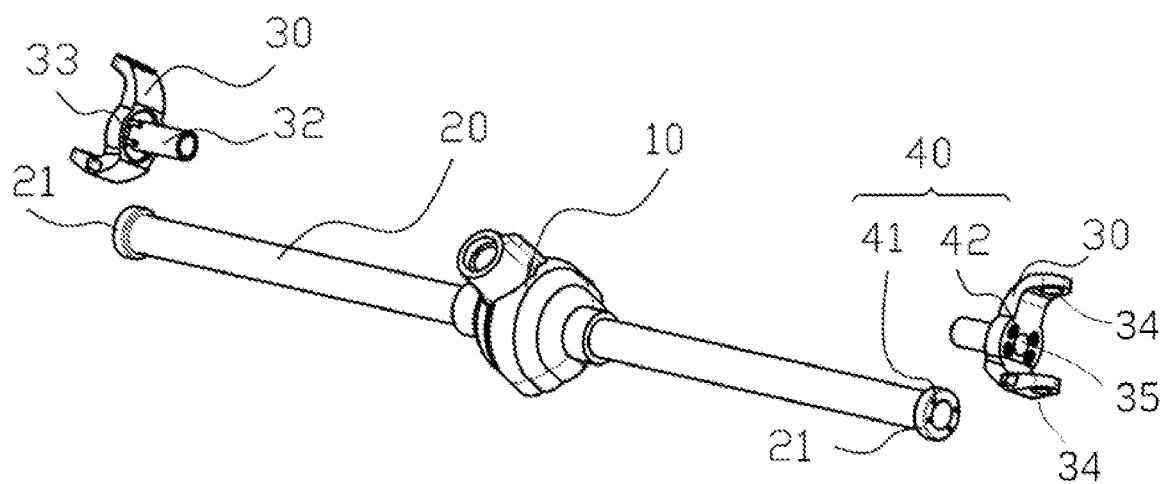
FIG. 2 is a schematic, exploded view of the front axle assembly of FIG. 1.
Figure 3:
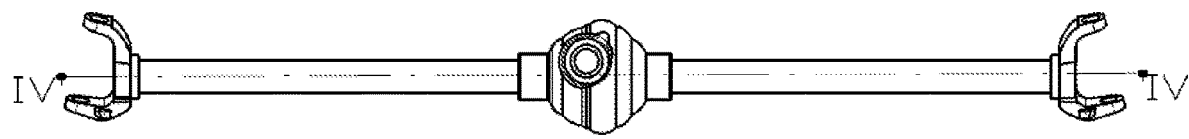
FIG. 3 is a schematic, front view of the front axle assembly of FIG. 1.
Figure 4:
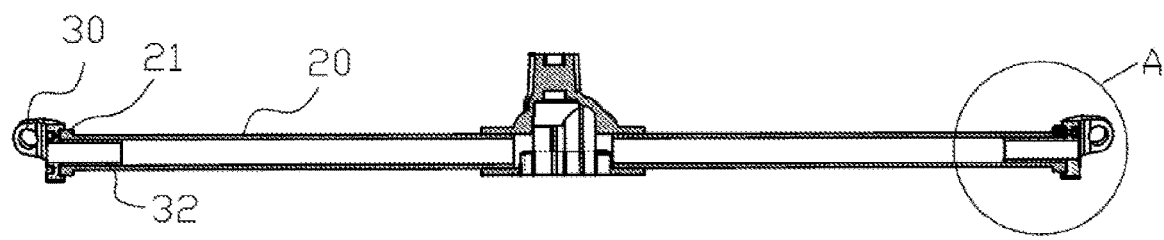
FIG. 4 is a schematic, cross-sectional view taken along line IV-IV of FIG. 3.
Figure 5:
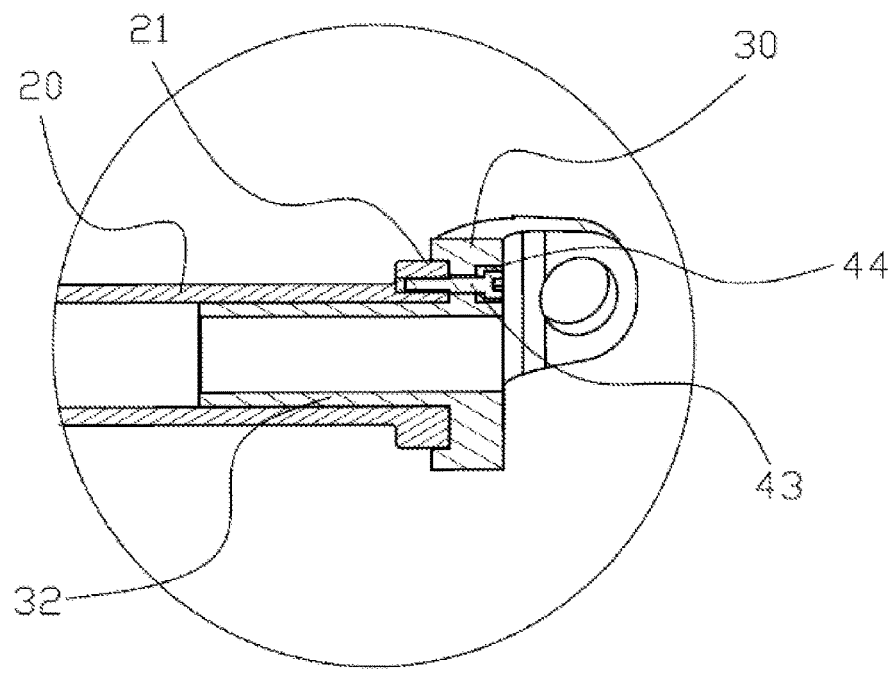
FIG. 5 is a schematic, enlarged view of the structure in circle A of FIG. 4.
Figure 6:
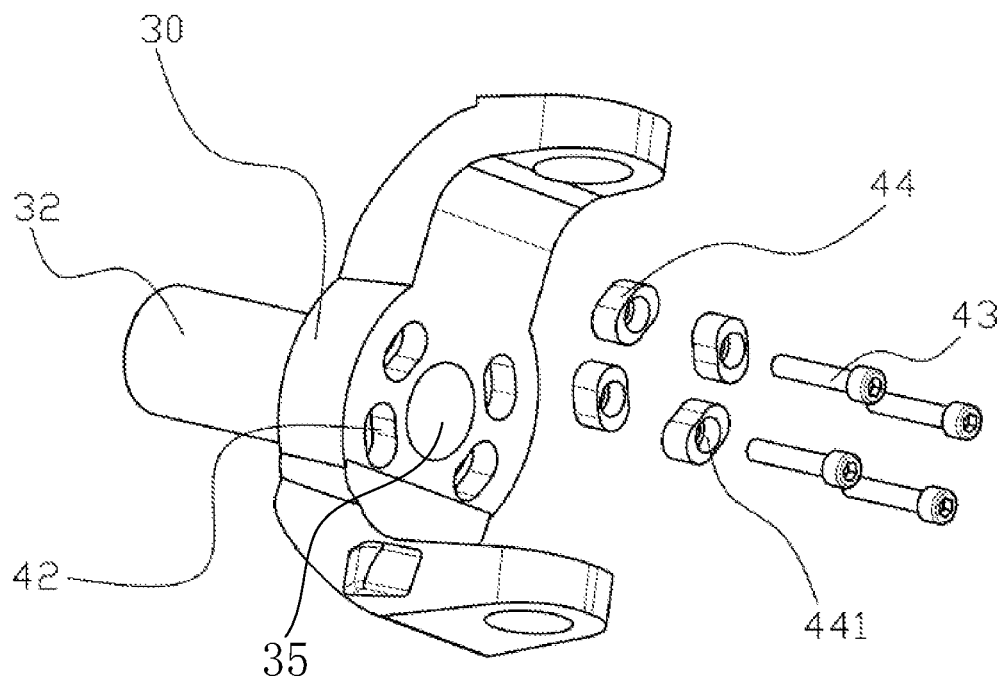
FIG. 6 is a schematic, exploded view of the inner-C-forging.
Figure 7:
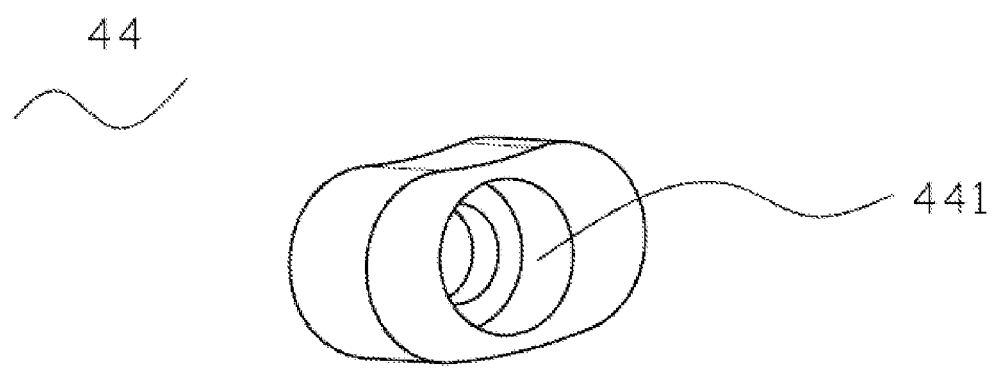
FIG. 7 is a schematic, isometric view of the insert of FIG. 6.

FIG. 1 is a schematic, isometric view of a front axle assembly according to a first embodiment of the present disclosure. FIG. 2 is a schematic, exploded view of the front axle assembly of FIG. 1. FIG. 3 is a schematic, front view of the front axle assembly of FIG. 1. FIG. 4 is a schematic, cross-sectional view taken along line IV-IV of FIG. 3. FIG. 5 is a schematic, enlarged view of the structure in circle A of FIG. 4. Referring to FIGS. 1-5, the front axle assembly of the first embodiment of the present disclosure may be a front solid axle and may include an axle housing 10 for connecting with a driveshaft, two axle tubes 20 respectively connected with two opposite sides of the axle housing 10, two inner-C-forgings 30 disposed at outer ends of the axle tubes 20 for connecting with two kingpin knuckles, respectively, and at least one connection structure 40 for detachably connecting at least one inner-C-forging 30 to its corresponding axle tube 20. The inner-C-forging 30 have different mounting positions on the axle tube 20, and a caster to pinion angle α (see FIG. 9) is different at inner-C-forging's different mounting positions.

In this embodiment, the inner-C-forging 30 is separately arranged from the corresponding axle tube 20, and detachably attached to the axle tube 20 through the connection structure 40. When the caster angle needs to be adjusted, the components on one side of the vehicle can be disassembled, and the connection structure 40 can be loosened, and the inner-C-forging 30 can be rotated around an axis of an axle shaft pass-through hole 35 to an appropriate angle and then be fixed to the axle tube 20 by tightening the connection structure 40. Since the inner-C-forging 30 is fixed to the axle tube 20 by the connection structure 40, by changing the installation angle of the inner-C-forging 30 with respect to the axle tube 20, the angle of a kingpin installation portion 34 can be changed, and the caster angle can further be adjusted. Since the inner-C-forging 30 can rotate about its own axis toward both the front side and rear side of the vehicle, no matter the caster angle at which side of the vehicle needs to be adjusted, it can be adjusted by adjusting the installation angle of the corresponding inner-C-forging 30. Since the inner-C-forging 30 is separately arranged from the axle tube 20, the integrity of the axle tube 20 is ensured, the mounting points of the components on the axle tube 20, such as the support point of the shock absorber and the connection point of the pull rod, can be arranged on a complete axle tube, and the strength of the front axle can be improved. Therefore, on the premise of ensuring the support strength, the front axle assembly can conveniently and independently adjust vehicle's caster angles on both sides and the pinion to driveshaft angle. Simultaneously, the original mounting locations and angles of all component mounting points on the axle tube are still intact, and the variables affecting the chassis wheelbase, directional accuracy and suspension height cannot be introduced.

Furthermore, in the present embodiment, the two axle tubes 20 are connected to the corresponding inner-C-forgings 30 by two connection structures 40.

With continued reference to FIGS. 2 and 4-6, in this embodiment, the connection structure 40 includes a plurality of first connection holes 41 disposed at one end of the axle tube 20, a plurality of second connection holes 42 disposed on the inner-C-forging 30, and a plurality of connectors 43. The connector 43 may include a bolt and a nut, and could pass through the second connection hole 42 and the first connection hole 41 to fix the inner-C-forging 30 to the axle tube 20. The first connection holes 41 are distributed around an axis of the axle tube 20, and the second connection holes 42 are distributed around an axis of the inner-C-forging 30, i.e., the axis of the axle shaft pass-through hole 35. Either the first connection hole 41 or the second connection hole 42 includes an oblong hole. In this embodiment, the second connection hole 42 includes an oblong hole with longitudinal centerlines of all oblong holes locating on a circle centered on the axis of the inner-C-forging 30. The connector 43 extends into the axle tube 20 from the side where the inner-C-forging 30 locates, so that the inner-C-forging 30 is secured to the axle tube 20 from the outer side of the front axle assembly, and helps to adjust the caster angle from the outer side of the vehicle body. When the inner-C-forging 30 is secured to the axle tube 20, the axis of the inner-C-forging 30 coincides with the axis of the front axle assembly and the axis of the axle tube 20.

With continued reference to FIGS. 4-8, a plurality of inserts 44 with its external contour adapted to the shape of the oblong hole are arranged in the oblong holes. A round third connection hole 441 is arranged on the insert 44, with the axis of the third connection holes 441 being set on a longitudinal centerline of the insert 44. The connector 43 sequentially passes through the third connection hole 441, the second connection hole 42 and the first connection hole 41 to connect the inner-C-forging 30 with the axle tube 20.

In the present embodiment, the oblong hole is a counterbore such that the bottom of the counterbore can support the insert 44 to prevent the insert 44 from coming off from the other side of the oblong hole.

The insert 44 has a plurality of different models. In different models of insert 44, the position of the axis of the third connection hole 441 is different. Due to the position of the axis of the third connection hole 441 is different in different models of insert 44, when the inner-C-forging 30 is connected to the axle tube 20 through the inserts 44, the kingpin mounting portion 34 forms a specific angle relative to the axis of the driveshaft. If the inner-C-forging 30 is fixed on the axle tube 20 by different models of inserts 44, the axis mounting portion 34 will have different angles relative to the axis of the driveshaft.

Figure 8:
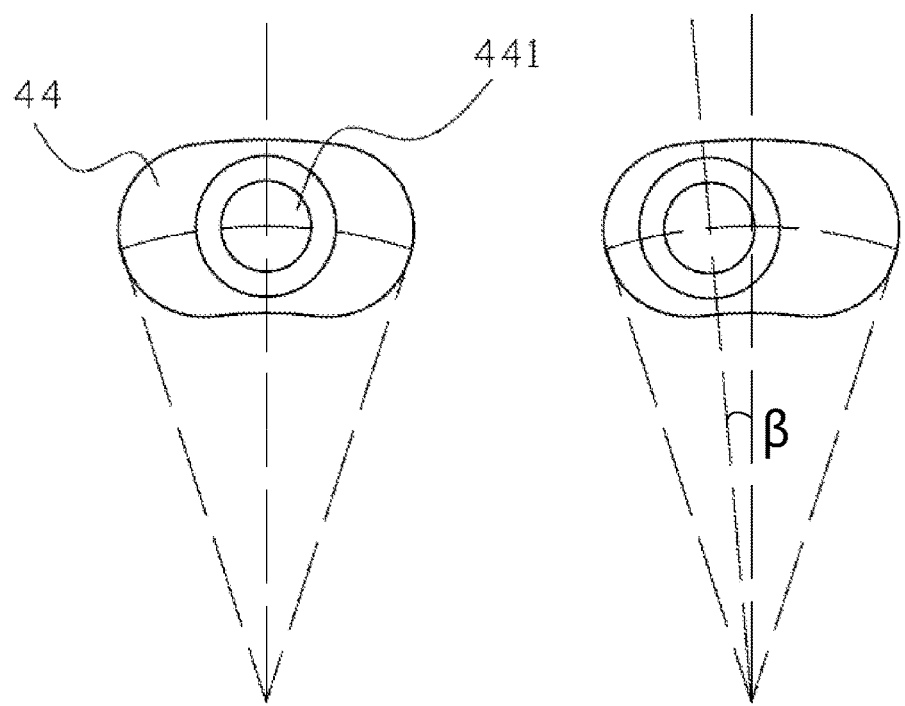
FIG. 8 is a schematic, front view of two different inserts.

Preferably, as shown in FIG. 8, when seen from the front side of the insert 44 and the inner-C-forging 30 is fixed on the corresponding axle tube 20, on the same plane, the axis of the third connection holes 441 of different models of inserts 44 are all set on the same circle centered on the axis of the front axle assembly, and the longitudinal centerlines of the inserts 44 are set on the same circle, either. That is, on the orthographic projection surface of the inserts 44, a center angle β formed by the axis of the third connection hole 441, the axis of the front axle assembly and the center of the insert 44 of different models is different.

More particularly, the position of the third connection hole 441 in different model of insert 44 is different makes the caster angle α can be adjusted within a range from 60° to 85°, preferably, the caster angle can be adjusted from 67.2° to 82.2°. Therefore, a center angle of an arc connecting the center of the insert 44 with a center of an outermost third connection hole 441 is 7.5 degrees in left and right directions. That is, a center angle of an arc connecting a center of an outermost left connection hole 441 and a center of an outermost right connection hole 441 is 15°. During assembly, the rotation angles of the inner-C-forging 30 around its axis toward the front and the back directions are both 7.5 degrees. By means of the arrangement, the requirement of various vehicles for adjusting the caster angle can be met.

Figure 9:
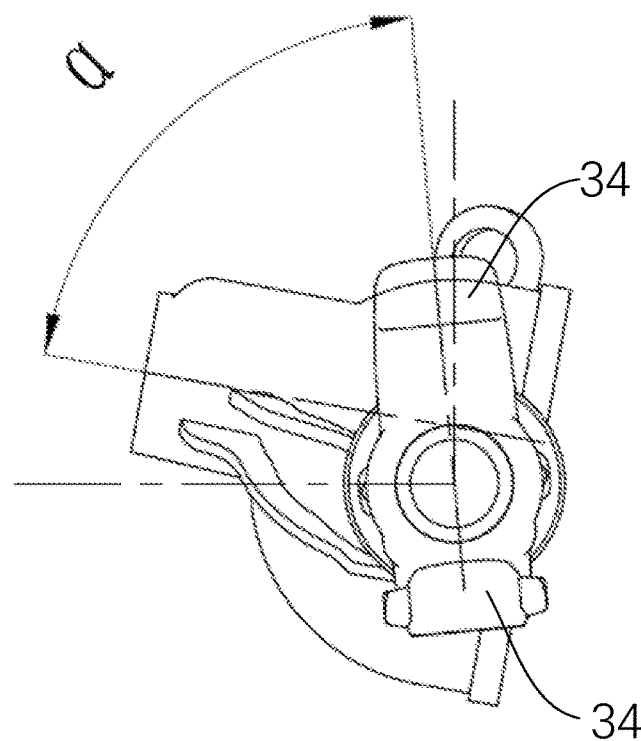
FIG. 9 is a schematic view of a caster to pinion angle.

FIG. 9 is a schematic view of the caster to pinion angle. As shown in FIG. 9, the caster to pinion angle α is shown, and the caster to pinion angle α is formed between the axis of the kingpin knuckle and the axis of the driveshaft, and the angle α equals to an angle formed between the inner-C-forging 30 and the driveshaft. By means of the forgoing arrangement, the included angle α can be adjusted within a range from 60° to 85° without dissembling peripheral components, so that the requirement of various vehicles for adjusting the caster angle can be met.

Furthermore, in this embodiment, a first flange 21 is formed on the axle tube 20 at the end facing the inner-C-forging 30, the first connection holes 41 are formed in the first flange 21, and the second connection holes 42 are formed in the end face of the inner-C-forging 30.

Furthermore, a reinforcing shaft 32 is further arranged on the inner-C-forging 30 at one side facing the axle tube 20. When the inner-C-forging 30 is connected to the axle tube 20, the reinforcing shaft 32 is inserted into the axle tube 20.

Furthermore, referring to FIG. 2, an accommodating cavity 33 is formed in one of the first flange 21 and the inner-C-forging 30, and the shape of the accommodating cavity 33 is adapted to the shape of the other one of the first flange 21 and the inner-C-forging 30. In the embodiment, the accommodating cavity 33 is formed on the inner-C-forging 30. When the inner-C-forging 30 is connected to the axle tube 20 by the connection structure 40, the first flange 21 or the inner-C-forging 30 is received in the accommodating cavity 33. By means of the arrangement of the accommodating cavity 33, the inner sidewall of the accommodating cavity 33 can support the outer sidewall of the first flange 21 or the inner-C-forging 30, which ensures the strength of the main axle.

Figure 10:
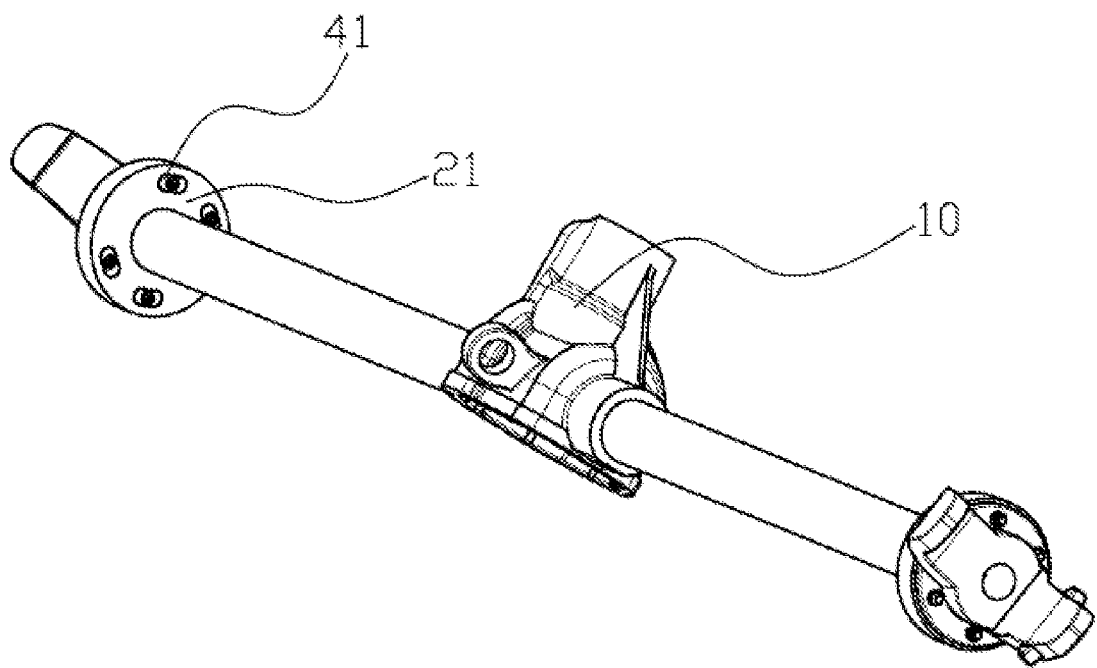
FIG. 10 is a schematic, isometric view of a front axle assembly according to a second embodiment of the present disclosure.
Figure 11:
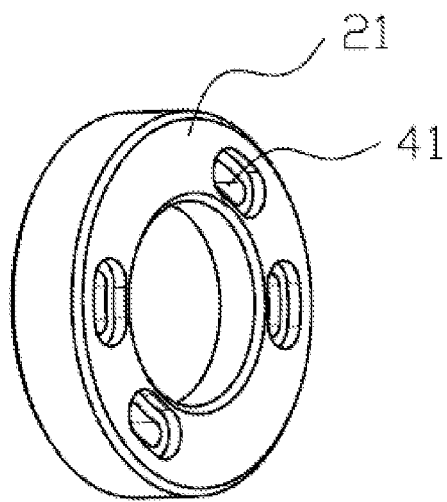
FIG. 11 is a schematic, isometric view of the connection structure of FIG. 10.
Figure 12:
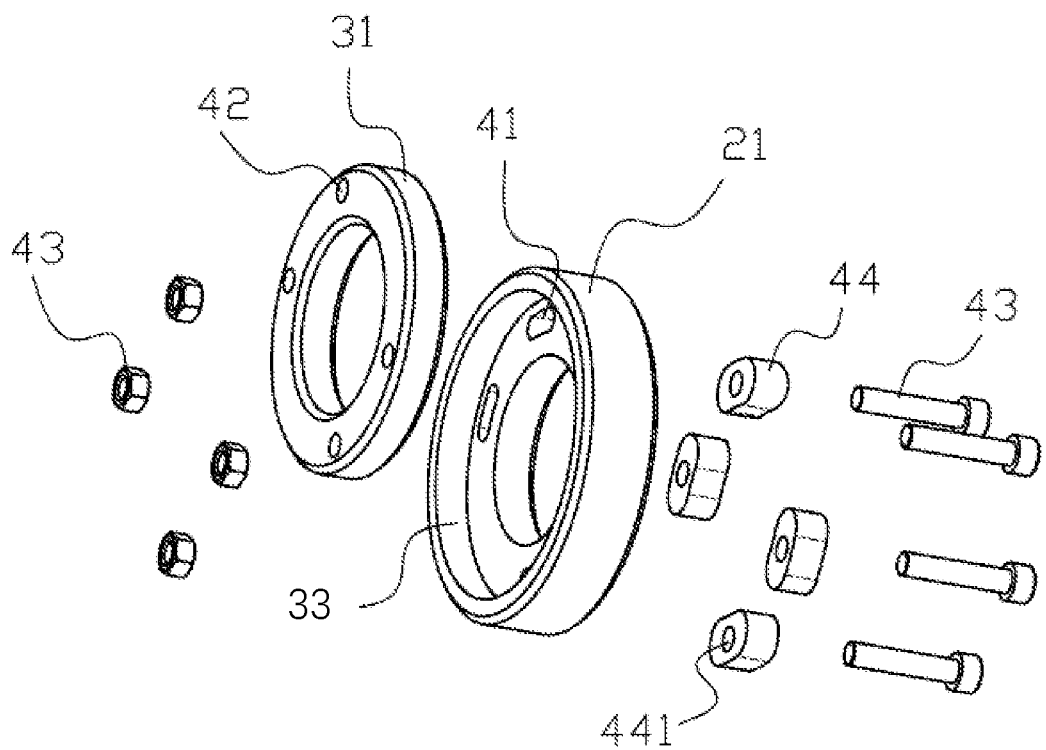
FIG. 12 is a schematic, exploded view of the connection structure of FIG. 11.
Figure 13:
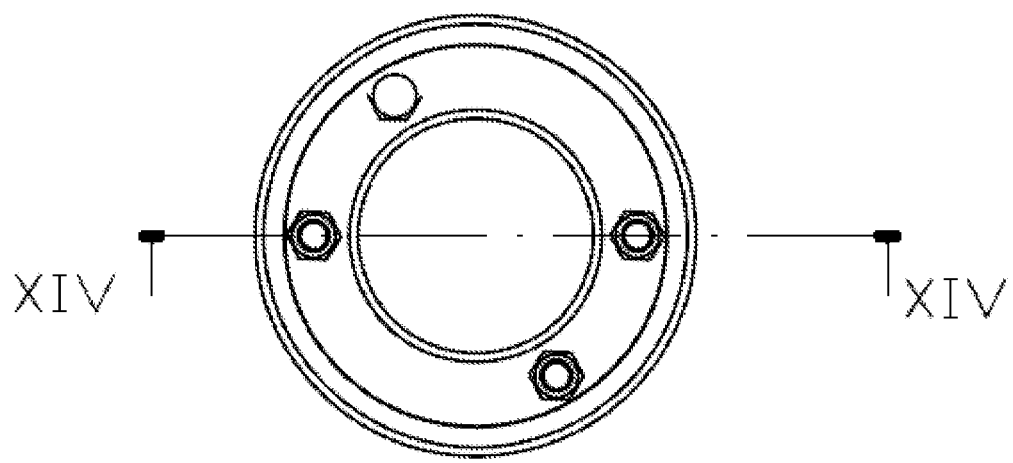
FIG. 13 is a schematic, front view of the connection structure of FIG. 12.
Figure 14:
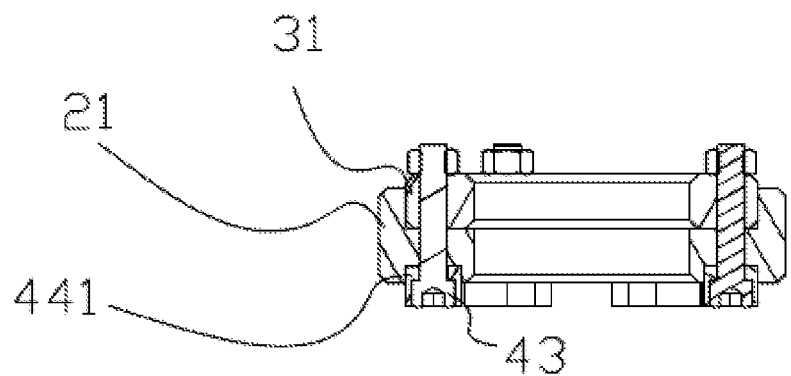
FIG. 14 is a schematic, cross-sectional view taken along line XIV-XIV of FIG. 13.

FIG. 10 is a schematic, isometric view of a front axle assembly according to a second embodiment of the present disclosure. FIG. 11 is a schematic, isometric view of the connection structure of FIG. 10. FIG. 12 is a schematic, exploded view of the connection structure of FIG. 11. FIG. 13 is a schematic, front view of the connection structure of FIG. 12. FIG. 14 is a schematic, cross-sectional view taken along line XIV-XIV of FIG. 13. As shown in FIGS. 10-14, a second embodiment of the present disclosure provides a front axle assembly substantially identical to the first embodiment, the difference is, in this embodiment, a second flange 31 is arranged on the inner-C-forging 30 at one side facing the axle tube 20, the second connection holes 42 are formed on the second flange 31, and the second connection holes 42 are symmetrically distributed on the periphery of the second flange 31. Correspondingly, the accommodating cavity 33 is formed on one of the first flange 21 and the second flange 31, that is, when the accommodating cavity 33 is formed on the inner-C-forging 30, the accommodating cavity 33 is formed on the second flange 31.

FIGS. 10-13 do not show the reinforcing shaft 32, it will be understood that in other embodiments, the reinforcing shaft 32 may also be provided on the second flange 31 at one side facing the first flange 21.

Figure 15:
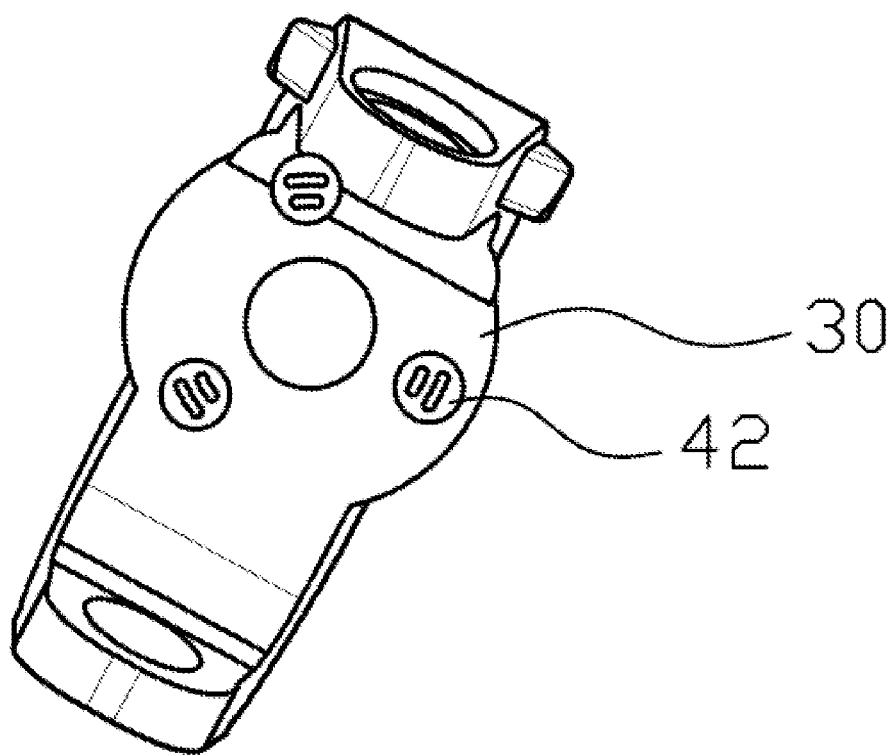
FIG. 15 is a schematic, front view of an inner-C-forging according to a third embodiment of the present disclosure.
Figure 16:
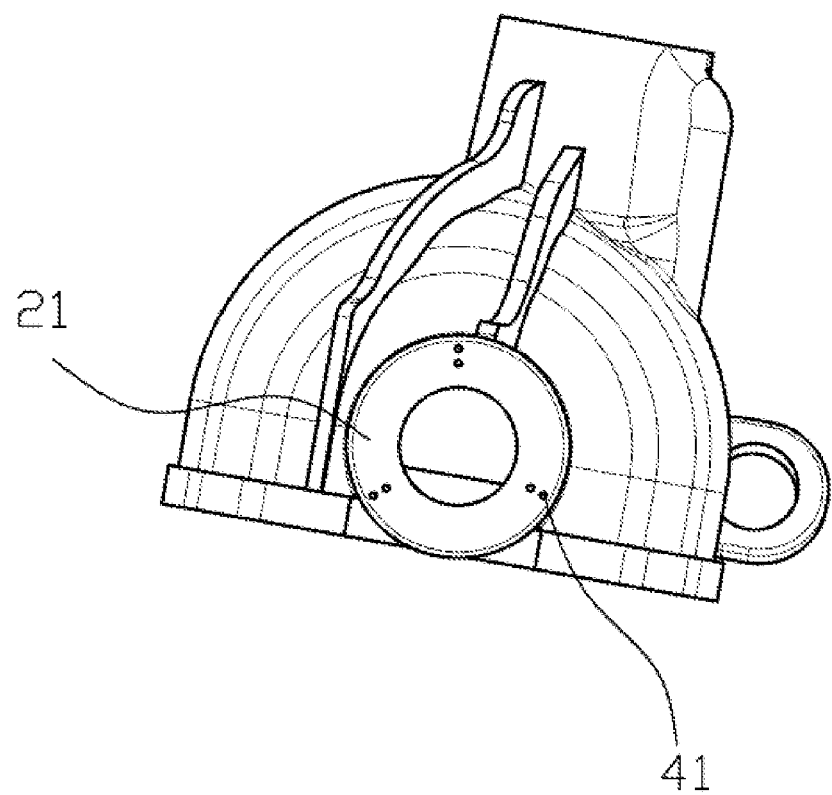
FIG. 16 is a schematic, front view of the axle tube.

FIG. 15 is a schematic, front view of an inner-C-forging according to a third embodiment of the present disclosure. FIG. 16 is a schematic, front view of the axle tube. As shown in FIGS. 15 and 16, the third embodiment of the present disclosure provides a front axle assembly substantially identical to the first embodiment and the second embodiment, the difference is, in the third embodiment, the first connection hole 41 or the second connection hole 42 is not an oblong hole, and the first connection hole 41 or the second connection hole 42 each is composed of a plurality of through holes arranged at intervals. That is, each of the first connection holes 41 or each of the second connection holes 42 indicates a range enclosing a plurality of through holes therein. The connector 43 is inserted into one of the through holes and the corresponding first connection hole 41 or second connection hole 42, to connect the inner-C-forging 30 with the axle tube 20. In this embodiment, each of the second connection holes 42 is composed of a plurality of through holes. The connector 43 is inserted through different through holes and the corresponding first connection hole 41 to realize different installation angles of the inner-C-forging 30 on the axle tube 20. In this embodiment, at each of the first connection hole 41 or the second connection hole 42, the plurality of through holes can intersect with each other to form a long hole, and a plurality of arc-shaped edges are formed on the longitudinal side of the long hole to determine the position of the connector 43. This can reduce the area occupied by multiple through holes, and can distribute more through holes in a determined area, so that the caster angle can be adjusted more accurately.

Furthermore, in this embodiment, when the inner-C-forging 30 is fixed to the axle tube 20, on the same plane and at each of the first connection holes 41 or the second connection holes 42, the axis of the plurality of through holes are all set on the same circle centered on the axis of the front axle assembly, or at each of the first connection holes 41 or the second connection holes 42, the axis of the plurality of through holes are all set on the longitudinal centerline of the insert 44.

Furthermore, in each of the inserts 44, the plurality of the through holes can be formed into two rows, in each row, the axis of the through holes are arranged on the same circle centered on the axis of the front axle assembly. That is, the distances from the axis of the two rows of through holes to the axis of the front axle assembly are different. Correspondingly, there are two second connecting holes 42 or two first connecting holes 41 on the axle tube 20 or the inner-C-forgoing corresponding to the two rows of through holes, with the second connecting holes 42 or the first connecting holes 41 spacing different distance from the axis of the front axle assembly. By means such arrangement, the caster angle can be adjusted with better accuracy for finer adjustment.

As shown in FIG. 15, the second connection hole 42 consisting of a plurality of through holes is formed in the inner-C-forging 30, and in the embodiment that the inner-C-forging 30 is provided with the second flange 3, the second connection hole 42 consisting of a plurality of through holes is formed in the second flange 31.

According to the forgoing descriptions, in the present disclosure, at least one inner-C-forging 30 is separated from its corresponding axle tube 20 and is detachably connected to the axle tube 20 through the connection structure 40. When the caster angle needs to be adjusted, the components at one side of the vehicle can be disassembled, the connection structure 40 can be loosed, the inner-C-forging 30 can be rotated around its own axis to an appropriate angle and then be fixed to the axle tube 20 by tightening the connection structure 40. Because the kingpin knuckle is mounted on the inner-C-forging 30 and its installation angle is identical with the installation angle of the inner-C-forging 30, the caster angle can be adjusted by changing the installation angle of the inner-C-forging 30 with respect to the axle tube 20. Because the inner-C-forging 30 can be rotated about its own axis toward the front and the rear directions of the vehicle, no matter the caster angle at which side of the vehicle needs to be adjusted, it can be adjusted by adjusting the installation angle of the corresponding inner-C-forging 30. Furthermore, since the inner-C-forging 30 is separated from the axle tube 20, and the integrity of the axle tube 20 is ensured, so that the mounting points of the components on the axle tube 20, such as the support point of the shock absorber, the base of the control arm and the connection point of various pull rods, can be arranged on the complete axle tube 20. Therefore, vehicle's caster angles on both sides and the pinion to driveshaft angle can be conveniently and independently adjusted while ensuring the support strength. Simultaneously, the original position and angle of the mounting points of all components on the axle tube is still intact, and the variables affecting the chassis wheelbase, directional accuracy and the suspension height will not be introduced.

The present disclosure also provides a vehicle including the front axle assembly. Other technical features of the vehicle can be referred to the prior art, and will not described further.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A front axle assembly comprising:
an axle housing configured for connecting with a driveshaft;
two axle tubes respectively connected with two opposite sides of the axle housing;
two inner-C-forgings, disposed at ends of the axle tubes and each being configured for connecting with a kingpin knuckle;
at least one connection structure, for detachably fixing at least one of the inner-C-forgings to a corresponding axle tube, the inner-C-forging having different mounting positions on the axle tube, correspondingly, a caster to pinion angle being different at inner-C-forging's different mounting positions.

2. The front axle assembly according to claim 1, wherein the two inner-C-forgings are detachably fixed on the corresponding axle tubes respectively through two connection structures.

3. The front axle assembly according to claim 1, wherein the connection structure comprises a first connection hole positioned on the axle tube, a second connection hole positioned on the inner-C-forging and a connector, the connector passes through the first connection hole and the second connection hole to fix the inner-C-forging to the axle tube.

4. The front axle assembly according to claim 3, wherein either the first connection hole or the second connection hole comprises an oblong hole, an insert is arranged in the oblong hole, and a third connection hole is formed in the insert, the insert has a plurality of different models, and positions of axis of the third connection holes on the inserts are different in different models.

5. The front axle assembly according to claim 4, wherein the axis of the third connection holes on the inserts of different models are all set on a same circle centered on the axis of the front axle assembly.

6. The front axle assembly according to claim 3, wherein either the first connection hole or the second connection hole is composed of a plurality of through holes arranged at intervals, and the connection member extends through one of the plurality of through holes and into a corresponding first connection hole or second connection hole to fix the inner-C-forging to the axle tube.

7. The front axle assembly according to claim 6, wherein at each of the first connection hole or the second connection hole, the axis of the plurality of through holes are arranged on a same circle with the axis of the front axle assembly as the center.

8. The front axle assembly according to claim 7, wherein at each of the first connection hole or the second connection hole, the plurality of the through holes form two rows, in each row, the axis of the through holes are arranged on the same circle with the axis of the front axle assembly as the center, the distances from the axis of the two rows of through holes to the axis of the front axle assembly are different.

9. The front axle assembly according to claim 3, wherein the axle tube is provided with a first flange, the first connection hole is formed in the first flange, and the second connection hole is formed on the end surface of the inner-C-forging.

10. The front axle assembly according to claim 3, wherein the axle tube is provided with a first flange, the first connection hole is formed in the first flange, the inner-C-forging is provided with a second flange, and the second connection hole is formed in the second flange.

11. The front axle assembly according to claim 3, wherein an accommodating cavity is formed in one of the first flange and the inner-C-forging, for receiving the inner-C-forging or the first flange therein.

12. The front axle assembly according to claim 1, wherein the inner-C-forging is provided with a reinforcing shaft, the reinforcing shaft extends into the axle tube when the inner-C-forging is mounted on the axle tube.

13. A front axle assembly comprising:
an axle housing configured for connecting with a driveshaft;
two axle tubes respectively connected with the axle housing;
two inner-C-forgings connected with the axle tubes and each being configured for connecting with a kingpin knuckle; and
at least one connection structure, for detachably fixing at least one of the inner-C-forgings to a corresponding axle tube, the inner-C-forging having different installation angles on the axle tube, and a caster to pinion angle being different at different installation angles.

14. The front axle assembly according to claim 13, wherein the connection structure comprises a plurality of first connection holes positioned on the axle tube, a plurality of second connection holes positioned on the inner-C-forging, and a connector being capable of passing through the first connection hole and the second connect hole to connect the axle tube with the inner-C-forging.

15. The front axle assembly according to claim 14, wherein one of the first connection hole and the second connection hole comprises an oblong hole, an insert is arranged in the oblong hole, and a third connection hole is formed in the insert, the insert has a plurality of different models, and positions of axis of the third connection holes on the inserts are different in different models.

16. The front axle assembly according to claim 15, wherein the axis of the third connection holes on the inserts of different models are all located on a longitudinal centerline of a corresponding insert, and the longitudinal centerline of the insert is located on a circle with an axis of the front axle assembly as the center.

17. The front axle assembly according to claim 16, wherein a center angle formed by the axis of the third connection holes, the axis of the front axle assembly and the center of different inserts is different.

18. The front axle assembly according to claim 15, wherein the caster to pinion angle is adjusted within a range from 60° to 85° by utilizing different models of the inserts.

19. The front axle assembly according to claim 14, wherein the first connection hole or the second connection hole is formed by a plurality of through holes, and the connector extends through one of the plurality of through holes into a corresponding first connection hole or a corresponding second connection hole, at each of the first connection hole or the second connection hole, the axis of the plurality of through holes are all set on a same circle with the axis of the front axle assembly as the center.

20. A vehicle, comprising a front axle assembly according to claim 1.

* * * * *